(12) United States Patent
Sangiovanni et al.

(10) Patent No.: US 8,342,220 B2
(45) Date of Patent: Jan. 1, 2013

(54) PROCESS AND APPARATUS FOR MANUFACTURING A REINFORCING STRUCTURE FOR TYRES OF VEHICLES

(75) Inventors: Stefano Sangiovanni, Milan (IT); Maurizio Marchini, Milan (IT); Massimo Mortarino, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 386 days.

(21) Appl. No.: 12/309,683

(22) PCT Filed: Jul. 28, 2006

(86) PCT No.: PCT/IB2006/002070
§ 371 (c)(1),
(2), (4) Date: Jan. 27, 2009

(87) PCT Pub. No.: WO2008/015486
PCT Pub. Date: Feb. 7, 2008

(65) Prior Publication Data
US 2009/0236029 A1    Sep. 24, 2009

(51) Int. Cl.
*B29D 30/16* (2006.01)
(52) U.S. Cl. ............ 156/397; 156/406.4; 156/408; 156/512
(58) Field of Classification Search ............ 156/117, 156/235, 354, 397, 408, 475, 405.1, 413, 156/121, 124, 133, 406.4, 486, 489, 492, 156/494, 512
See application file for complete search history.

(56) References Cited

U.S. PATENT DOCUMENTS

| | | | | |
|---|---|---|---|---|
| 3,321,105 A | * | 5/1967 | Marano | 221/22 |
| 3,990,933 A | * | 11/1976 | Verch | 156/250 |
| 5,979,531 A | * | 11/1999 | Barr et al. | 156/574 |
| 6,026,883 A | * | 2/2000 | Hegerhorst et al. | 156/441 |
| 6,355,126 B1 | | 3/2002 | Ogawa | |
| 6,457,504 B1 | | 10/2002 | Caretta | |
| 6,763,868 B1 | | 7/2004 | Caretta | |
| 6,783,619 B2 | | 8/2004 | Caretta | |
| 6,941,992 B2 | | 9/2005 | Caretta | |
| 7,462,252 B2 | * | 12/2008 | Schaller et al. | 156/64 |
| 2002/0053389 A1 | * | 5/2002 | Martin et al. | 156/126 |
| 2002/0124935 A1 | | 9/2002 | Caretta | |
| 2002/0189737 A1 | | 12/2002 | Caretta | |

(Continued)

FOREIGN PATENT DOCUMENTS

EP         98830472.1         7/1998

(Continued)

*Primary Examiner* — Richard Crispino
*Assistant Examiner* — Martin Rogers
(74) *Attorney, Agent, or Firm* — Finnegan, Henderson, Farabow, Garrett & Dunner, L.L.P.

(57) ABSTRACT

In tire manufacture, a belt structure is made by means of strip-like segments each including parallel cords incorporated into an elastomeric layer, which strip-like segments are sequentially laid down in mutual circumferential side by side relationship on a toroidal support. The apparatus for manufacturing such a reinforcing structure for vehicle tires includes: a feeding unit to supply strip-like elements, each including threadlike elements disposed parallel to each other and at least partly coated with at least one layer of elastomeric material; a laying unit including at least one laying assembly to apply each of said strip-like elements onto a toroidal support according to a predetermined laying angle relative to a circumferential extension direction of the toroidal support itself, the laying unit including at least one presser element movable in contrast relationship against the outer surface of the toroidal support and at least one guide element to keep the strip-like element centered and guide it during laying of same, wherein the guide element includes at least one cavity in which the presser element is at least partly housed during laying of said strip-like element.

6 Claims, 4 Drawing Sheets

U.S. PATENT DOCUMENTS

| | | |
|---|---|---|
| 2003/0024627 A1 | 2/2003 | Ohkubo |
| 2005/0076988 A1* | 4/2005 | Noto et al. .................... 152/526 |
| 2005/0077011 A1 | 4/2005 | Pialot |
| 2005/0224159 A1* | 10/2005 | Suda et al. .................... 156/123 |
| 2006/0096711 A1 | 5/2006 | Suda |

FOREIGN PATENT DOCUMENTS

| | | |
|---|---|---|
| EP | 98830661.9 | 10/1998 |
| EP | 0 928 680 A1 | 7/1999 |
| EP | 0 943 421 A1 | 9/1999 |
| EP | 1 279 485 A2 | 1/2003 |
| EP | 1 541 326 A1 | 6/2005 |
| JP | 5-124131 | 5/1993 |
| JP | 7-164559 | 6/1995 |
| WO | WO-01/38077 A1 | 5/2001 |
| WO | WO-03/101713 A1 | 12/2003 |

* cited by examiner

PROCESS AND APPARATUS FOR MANUFACTURING A REINFORCING STRUCTURE FOR TYRES OF VEHICLES

CROSS REFERENCE TO RELATED APPLICATION

This application is a national phase application based on PCT/IB2006/002070, filed Jul. 28, 2006, the content of which is incorporated herein by reference.

BACKGROUND OF THE INVENTION

1. Field of the Invention

The present invention relates to a process and an apparatus for manufacturing a reinforcing structure for tyres of vehicles through application of strip-like elements in mutual side by side relationship along the circumferential extension of a toroidal support so as to form at least one reinforcing layer having a continuous circumferential extension around a geometric rotation axis.

2. Description of the Related Art

Each of said strip-like elements comprises longitudinal reinforcing threadlike elements disposed parallel to each other and at least partly coated with at least one layer of elastomeric material.

In the present specification, the invention will be depicted with particular reference to manufacture of a belt structure of a tyre. It is however pointed out already now that the apparatus in accordance with the invention can be also used for manufacturing a carcass structure of the tyre or, more generally, any other reinforcing structure comprising cords oriented parallel to each other and according to a predetermined angle relative to an equatorial plane of the tyre itself.

A tyre for vehicle wheels usually comprises a carcass structure essentially made up of one or more carcass plies of a substantially toroidal shape and having their axially opposite side edges in engagement with respective annular reinforcing structures incorporating circular inserts usually referred to as "bead cores". Each annular reinforcing structure is incorporated into a so-called "bead" defined along an inner circumferential edge of the tyre for anchoring of the latter to a corresponding mounting rim.

Applied to the carcass structure, at a radially external position, is a belt structure comprising one or more belt layers in the form of an endless ring and essentially made up of textile or metallic cords suitably oriented with respect to each other and to the cords belonging to the adjacent carcass plies.

Also applied to the belt structure, at a radially external position, is a tread band usually consisting of a strip of elastomeric material of suitable thickness. It is to be pointed out that, to the aims of the present description, by the term "elastomeric material" it is intended a compound comprising at least one elastomeric polymer and at least one reinforcing filler. Preferably, this compound further comprises additives such as cross-linking agents and/or plasticizers, for example. Due to the presence of the cross-linking agents, this material can be cross-linked through heating, so as to form the final article of manufacture.

A pair of sidewalls is applied to the opposite sides of the tyre, each of them coating a side portion of the tyre included between a so-called shoulder region, located close to the corresponding side edge of the tread band, and the corresponding bead.

Recently, particular attention has been paid to the possibility of finding production methods enabling manufacture of intermediate semi-finished products to be eliminated or at least reduced, in the field of tyre building. For instance, in the European Patent Application EP09288680 in the name of the same Applicant, it is described a method of manufacturing tyres in which the carcass ply or plies, as well as each of the belt layers, are obtained by laying a plurality of strip-like elements one after the other in circumferential side by side relationship, on a toroidal support conforming in shape to the inner conformation of the tyre to be obtained.

In document U.S. Pat. No. 6,355,126 it is described a method and an apparatus for manufacturing a belt layer through laying of strip-like elements cut from a continuous ribbon-like element. Each strip-like element, once cut from the continuous ribbon-like element, is picked up by grip members of the magnetic type or provided with suction cups, controlled by one or more robotized arms. The grip members retain the strip-like element at the opposite ends of same, and possibly at a central portion thereof, and are moved upon command of the robotized arms to cause application of the strip-like element itself onto the outer surface of a toroidal support, according to a predetermined angle relative to the circumferential extension of said support. When application has been completed, the toroidal support is rotated around its geometric axis according to a predetermined angle, to enable application of a new strip-like segment at a position adjacent to the previously applied one. Sequential repetition of the above described steps causes formation of a belt layer extending along the whole circumferential extension of the toroidal support.

In document WO01/38077 in the name of the same Applicant it is described another method and apparatus for manufacturing a belt layer for vehicle tyres, through laying of strip-like elements cut from a continuous ribbon-like element. In detail, the strip-like segments thus cut are applied in mutual side by side relationship along the circumferential extension of a toroidal support to form at least one reinforcing layer having a continuous circumferential extension around a geometric rotation axis (X-X) of the toroidal support. During this application, a relative angular rotation is determined between the strip-like segment itself and the toroidal support, around a correction axis substantially radial to the geometric rotation axis of the toroidal support.

The Applicant has however perceived that laying of strip-like elements carried out following the teachings of the known art could determine unevenness in the reinforcing structure.

In particular, the Applicant has noticed that in the laying apparatus according to application WO01/38077 it is difficult to carefully control laying of the ends of the strip-like element. This could involve a loss of accuracy in following the predetermined laying trajectory and an insufficient adhesion of the end tips of the strip-like element.

The Applicant has further noticed that in laying apparatus for strip-like elements of the known art it is not possible to maintain a contact between the element exerting a laying pressure and the supporting drum, over the whole width of the presser element along all the laying outline, above all with high-camber outlines of the toroidal support, such as the toroidal supports used for motorcycle tyres for example.

This lack of contact may cause, in this case too, an insufficient adhesion of the strip-like element, above all at the ends thereof.

SUMMARY OF THE INVENTION

The Applicant has now found that it is possible to ensure a high structural evenness in a reinforcing structure obtained by sequential laying of strip-like elements, by reducing the distance between the element exerting the laying pressure on the strip-like element and the element guiding said strip-like element during this step.

The Applicant has further found that it is possible to ensure contact between the element exerting the laying pressure on the strip-like element and the toroidal support over the whole width of the strip-like element by dividing this presser element into at least two parts and mounting the two parts of the presser element thus obtained in an independent manner.

In a first aspect, the invention relates to an apparatus for manufacturing a reinforcing structure for tyres of vehicles, comprising:
- a feeding unit to supply strip-like elements each comprising threadlike elements disposed parallel to each other and at least partly coated with at least one layer of elastomeric material;
- a laying unit comprising at least one laying assembly to apply each of said strip-like elements onto a toroidal support, according to a predetermined laying angle (α) relative to a circumferential extension direction of the toroidal support itself;
- said laying assembly comprising at least one presser element, movable in contrast relationship against the outer surface of the toroidal support and at least one guide element to keep the strip-like element centred and guide it during laying of same; wherein said guide element comprises at least one cavity adapted to house the presser element at least partly.

In case of need, the guide element may be advantageously provided to have a C-shaped conformation.

It is also preferably provided that the guide element should comprise a main body and two prongs defining said cavity together with the main body.

In another preferred aspect of the present invention, the prongs are pivotally mounted in an independent manner on the main body, and the guide element comprises spring means acting to keep one end of each of the prongs in contrast relationship with the toroidal support during laying of the strip-like element.

It is also conveniently provided that each laying assembly should comprise at least one second presser element disposed downstream of the first presser element to lay the strip-like element on the surface of the toroidal support over the whole width thereof.

Preferably, two second presser elements are provided for each laying assembly and they are mounted in an independent manner.

According to a preferred embodiment, the overall width of the second presser rollers is greater than or equal to the width of the strip-like element to be laid down.

In a further aspect, the invention relates to a process for producing tyres on a toroidal support, which tyres comprise a reinforcing structure made up of at least one layer having a continuous circumferential extension around the geometric rotation axis X-X of the toroidal support and formed of a plurality of strip-like elements distributed in mutual side by side relationship along the circumferential extension of the toroidal support; the process comprising the following steps:
a) bringing two first presser elements in coupling relationship with two respective guide elements to form two laying assemblies so as to retain a strip-like element;
b) translating the laying assemblies towards the toroidal support so that the strip-like element is radially moved close to the toroidal support until it comes into contact at its central portion with the outer surface of the toroidal support itself enabling it to be pressed at the equatorial plane of the toroidal support;
c) moving said laying assemblies away from each other, to translate said first presser elements along the strip-like element, away from the equatorial plane, to cause application of the strip-like element in such a manner that the strip-like element is retained and guided by said laying assemblies substantially along all its longitudinal extension;
d) angularly rotating the toroidal support around a geometric axis X-X thereof according to a predetermined angular pitch, to make it ready for application of a new strip-like element;
e) sequentially repeating steps a) to d) to obtain the reinforcing structure.

BRIEF DESCRIPTION OF THE DRAWINGS

Further features and advantages of the present invention will become more apparent from the detailed description of a preferred but not exclusive embodiment of an apparatus for manufacturing a reinforcing structure for tyres of vehicles according to the present invention. This description will be set out hereinafter with reference to the accompanying drawings, given by way of non-limiting example, in which.

DETAILED DESCRIPTION OF THE INVENTION

Figure 1:
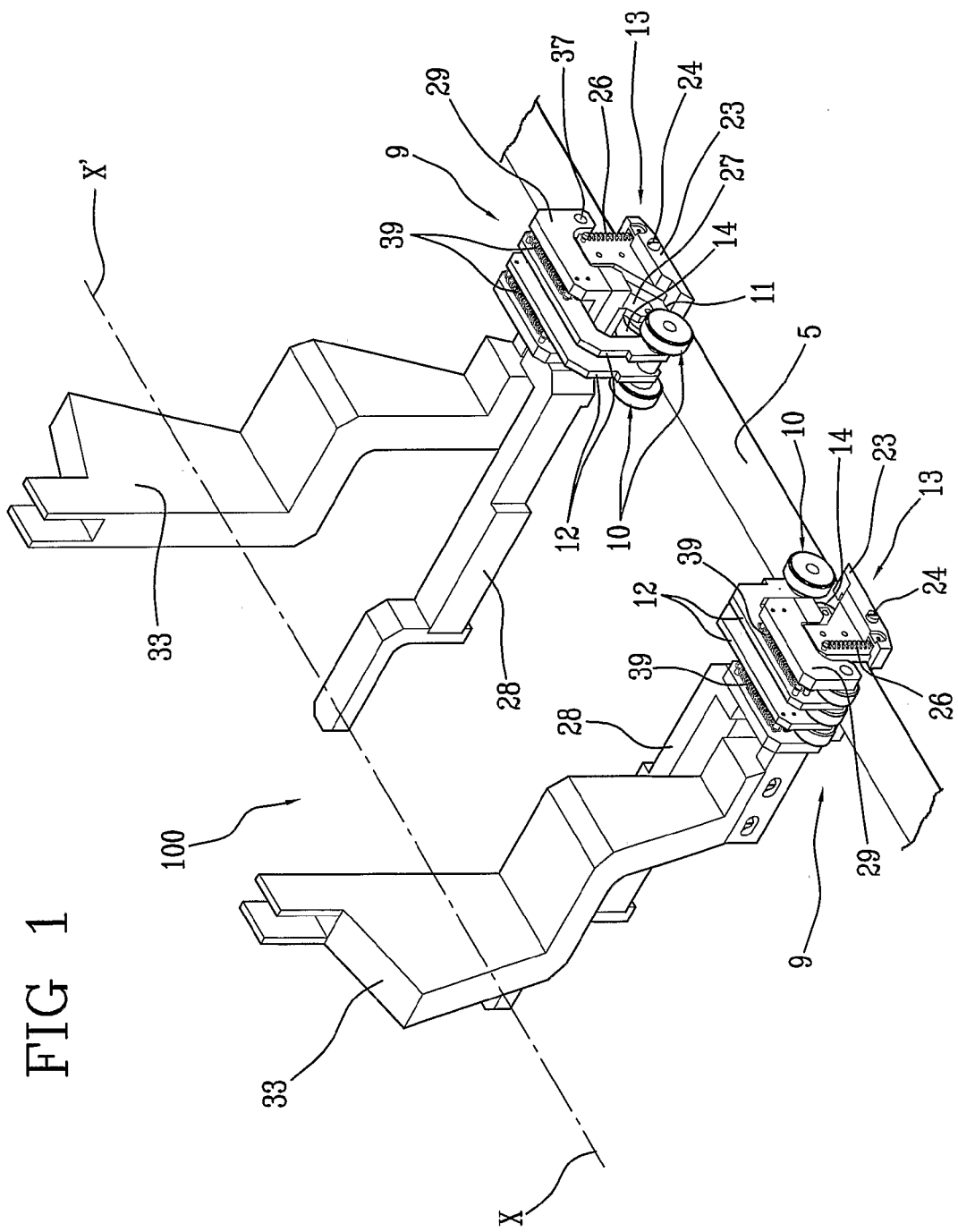
FIG. 1 diagrammatically shows an apparatus according to the invention in an operating step during which a strip-like element is about to be laid onto a toroidal support.
Figure 2:
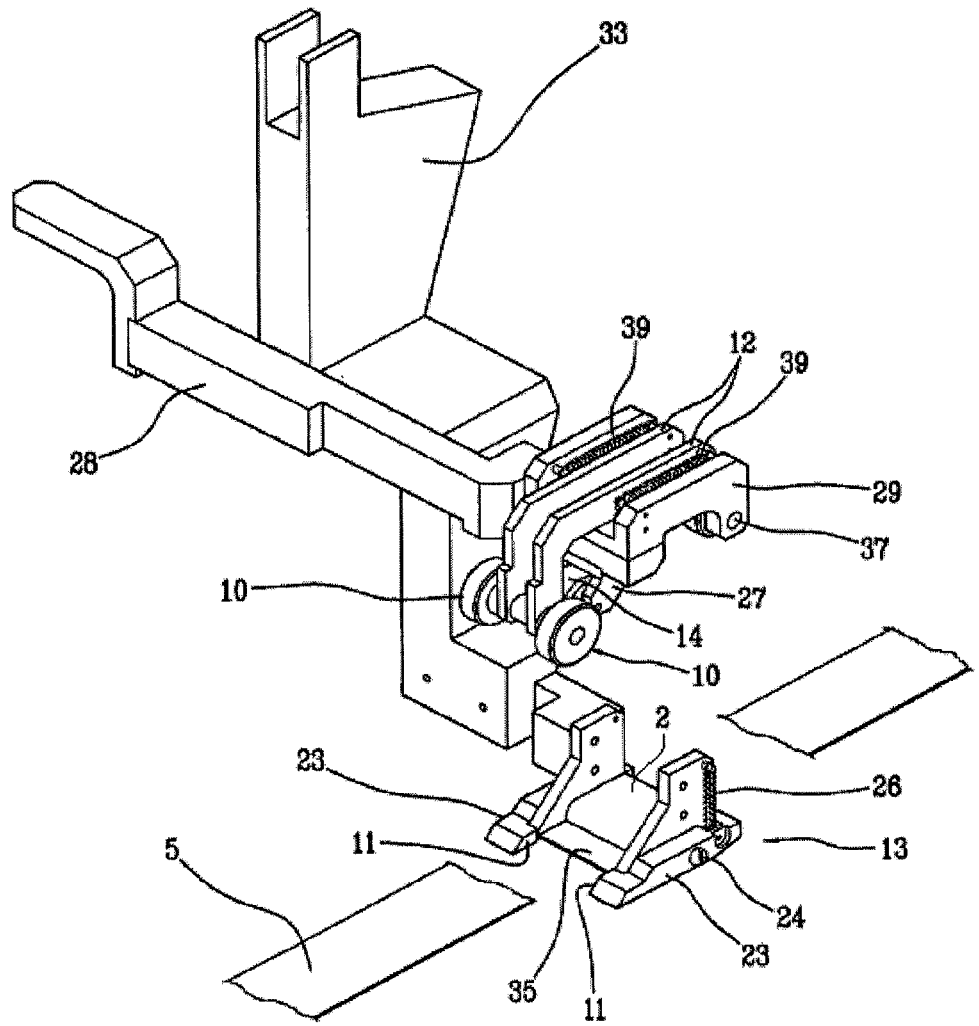
FIG. 2 is a diagrammatic exploded view of a laying assembly according to the present invention.

With reference to the drawings, an apparatus for manufacturing reinforcing structures for tyres of vehicles in accordance with the present invention has been generally denoted at 1.

In the embodiment described, apparatus 1 lends itself to manufacture a belt structure on a toroidal support 3 having an outer surface 3a substantially conforming in shape to the inner configuration of the tyre to be obtained.

Preferably, before carrying out manufacture of the belt structure, a carcass structure (not shown in the drawings) is applied; said carcass structure can be conveniently formed on the same toroidal support 3 following the description disclosed in anyone of the following patents or patent applications, EP0943421, EP0928680, EP98830661.0, EP98830472.1, all in the name of the same Applicant. The toroidal support 3, not described in detail because it can be manufactured in any convenient manner by a person skilled in the art, can for example consist of a dismountable or collapsible metal drum to facilitate subsequent removal of same from the obtained tyre. However, the belt structure can also be directly manufactured on the carcass structure, suitably stiffened by inflation for example, in this case said carcass structure also performing the function of a toroidal support. It is also to be pointed out that, in case of need, apparatus 1 is adapted to be also used to manufacture the carcass structure itself, or any other reinforcing structure of the tyre.

Apparatus 1 comprises at least one feeding unit provided to supply strip-like elements 5 of predetermined length, one by one, said strip-like elements being obtained by cutting operations sequentially carried out on at least one continuous ribbon-like element 6 coming from a drawing and/or calendering device, or from a feeding reel not shown in the figures. The continuous ribbon-like element 6, and consequently the strip-like elements 5 obtained therefrom, each have a plurality of threadlike elements and/or cords of metallic or textile material, extending parallel to each other along the longitudinal extension of the ribbon-like element and the strip-like element itself, and at least partly coated with a layer of elastomeric material applied through a drawing and/or calendering operation.

Figure 3:
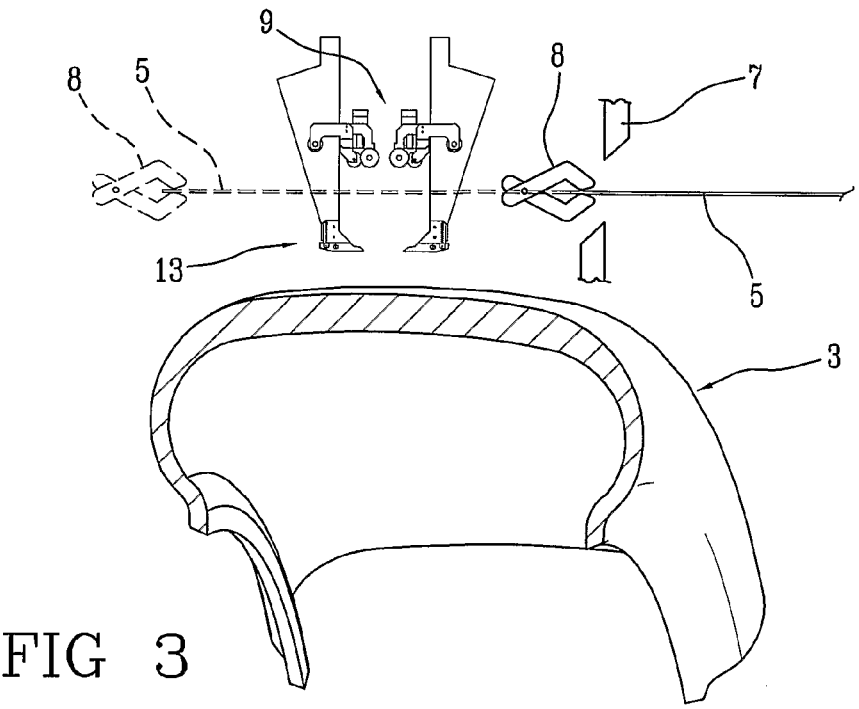
FIG. 3 diagrammatically shows the apparatus seen in FIG. 1, in which one end of a continuous ribbon-like element is about to be grasped by a grip element.
Figure 4:
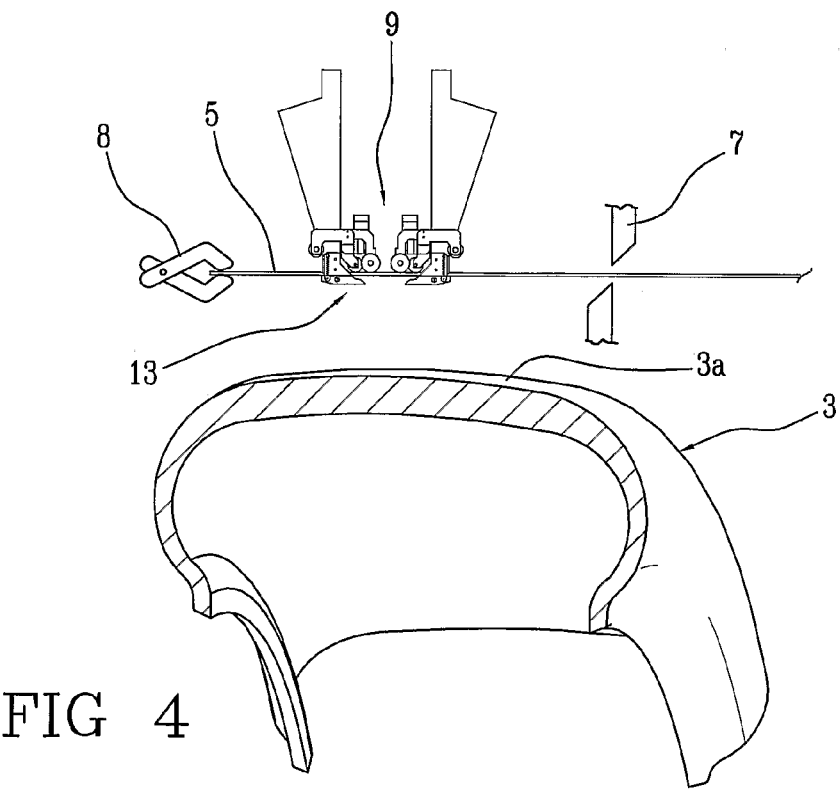
FIG. 4 shows a step subsequent to FIG. 3, in which the ribbon-like element has been stretched out next to the toroidal support and engaged by the laying unit.

The feeding unit is of known type such as that described in patent application WO 01/38077 for example, in the name of the same Applicant, and comprises at least one cutting member 7 designed to cut the continuous ribbon-like element 6 perpendicularly or according to a predetermined inclination relative to the longitudinal extension of same, to obtain the individual strip-like elements 5. Combined with the cutting member 7 is at least one grip member 8 movable between a first work position at which, as shown in FIG. 3, it lends itself to engage a final end 6a of the continuous ribbon-like element 6 close to the cutting member 7, and a second work position at which it is spaced apart from the cutting member itself. As shown in FIG. 4, following translation from the first to the second work positions, the grip member 8 drives the continuous ribbon-like element 6 so as to stretch it out beyond the cutting member 7 and preferably at a radially approached position relative to the toroidal support 3, over a length corresponding to that of the strip-like element 5 to be obtained following subsequent operation of the cutting member itself.

Apparatus 1 further comprises at least one laying unit 100 preferably provided with two laying assemblies 9, 9', operating on the continuous ribbon-like element 6 in a region immediately upstream of the cutting member 7.

The laying assemblies 9, 9' lend themselves to engage each of the strip-like elements 5 sequentially coming out of the feeding unit. The two laying assemblies 9, 9' operatively cause application of said strip-like elements 5 onto the outer surface 3a, of the toroidal support 3, or onto the carcass structure formed thereon, according to a predetermined laying angle relative to a circumferential extension direction of the toroidal support itself.

The laying angle α can be easily pre-set either by suitably orienting the laying unit 100 and possibly the feeding unit relative to the toroidal support, or by suitably orienting said toroidal support relative to the laying unit 100 and feeding unit.

Each laying assembly 9, 9' comprises at least one presser element 14 movable along the strip-like element 5, in contrast relationship against the outer surface 3a of the toroidal support 3 to cause application of the strip-like element, and at least one guide element 13 to keep the strip-like element 5 centred and guide it during laying.

The presser element 14 is represented by a rotating roller supported by a supporting arm 28, while the guide element 13 comprises at least one cavity or recess 11 to house said rotating roller 14 at least partly. The rotating roller 14 has the task of forcing the strip-like element 5, at the central region thereof, against the toroidal support 3, preventing the strip-like element itself from folding upon itself, by effect of possible angular laying corrections, thus adversely affecting centering with respect to the guide element 13. According to an advantageous aspect of the present invention, the guide element 13 substantially has a C-shaped conformation. In more detail, still according to a preferred embodiment, the guide element 13 appears to have a main body 2 and two projecting elements such as two prongs 23, adapted to define the housing cavity 11 together with the main body 2.

As shown in FIG. 1, the two prongs 23 are pivotally mounted in an independent manner on the main body 2, at 24, and are operationally connected to spring means 26, such as helical springs for example, in turn connected to the main body 2.

The spring means 26 is connected to one end of prongs 23 and acts so as to maintain the opposite end of same in contrast relationship with the outer surface 3a of the toroidal support 3.

The inner distance between the prongs 23, i.e. the width of cavity 11, must be greater than the width of the strip-like element to be laid down so as to maintain the strip-like element 5 internally centred to guide it during laying on the outer surface 3a of the toroidal support 3.

Preferably, the inner distance between the prongs 23 is greater than the width of the rotating presser roller 14.

The guide element 13 further has a curvilinear counter-surface 34 on which the strip-like element 5 slides in a position of contrast with the presser roller 14 and a metal flap 35 supporting and retaining the ends of the strip-like element 5 at the final laying instants. According to a preferred embodiment shown in the figures, the guide element 13 is supported by an arm 33 movable along a guide structure upon the action of transverse-movement devices, of the worm screw type for example, not shown as they can be made in any manner convenient for a person skilled in the art.

To lay the strip-like element 5 onto the outer surface 3a of the toroidal support 3 over the whole width thereof, use of at least one second presser element 10 of suitable width is provided for each laying assembly 9, 9', said second presser element being disposed downstream of the first presser element 14.

In detail, in the preferred embodiment shown in the figures, two second presser elements 10 are provided for each laying assembly 9, 9'. In a preferred aspect, the second presser elements 10 are embodied by rotating rollers. The overall width of the two second presser rollers 10 must be greater than the width of the strip-like element 5 so that during laying, pressure can be exerted on the end tips of the strip-like elements possibly deformed by effect of an angular laying correction, if any. According to an advantageous aspect of the present invention, the second presser rollers 10 are mounted in a mutually independent manner to ensure that the same will stay in contrast relationship against the outer surface of the toroidal support 3 for the whole laying trajectory, above all at the shoulders of the toroidal support 3.

To this aim, each second presser roller 10 is rotatably supported by a support lever 12 pivotally mounted in an independent manner on a supporting element 28 adapted to bear the first presser element 13 too, by means of a bracket 27.

Also provided is the presence of further spring means such as helical springs 39 disposed between said support levers 12 and the supporting arms 28 to keep each roller 10 in contrast relationship, in an independent manner, against the outer surface 3a of the toroidal support 3.

In detail, each supporting arm 28 has two projecting elements 29 of a substantially L-shaped conformation and adapted to carry the rotation centre on which the support levers 12 are pivotally mounted.

It is further to be noticed that the supporting arms 28 can rotate relative to an end thereof. In fact, to promote translation of the grip member 8 between the first and second operating positions in the absence of mechanical interferences and to facilitate engagement between the strip-like element 5 coming out of the feeding device and each laying assembly 9, 9', the supporting arms 28 can angularly rotate about a longitudinal extension axis X-X' passing through an end thereof.

Angular rotation of arms 28 causes rotation of the respective presser elements 14, 10 between a rest position at which, as shown in FIG. 3, they are moved apart from a longitudinal movement trajectory imposed to the continuous ribbon-like element 6 by the grip member 8, and a work position at which, as shown in FIG. 4, they are disposed on said movement trajectory and act in coupling relationship with the guide elements 13 and the continuous ribbon-like element interposed therebetween. In detail, at the end of the rotation of the supporting arms 28 the presser element 14 is housed within cavity 11 at least partly. To establish the correct position of the presser element 13 within cavity 11, the guide element is provided with two spacers 37 adapted to come into engagement with the supporting arms 28.

Also associated with the laying unit 10, are radial-movement devices designed to cause translation of each laying assembly 9, 9', once coupling between rollers 14, 10 and guide element 13 has occurred, radially close to or away from the outer surface 3a of the toroidal support 3.

These radial-movement devices are not shown or described in detail because they can be made in any manner convenient for a person skilled in the art.

Figure 5:
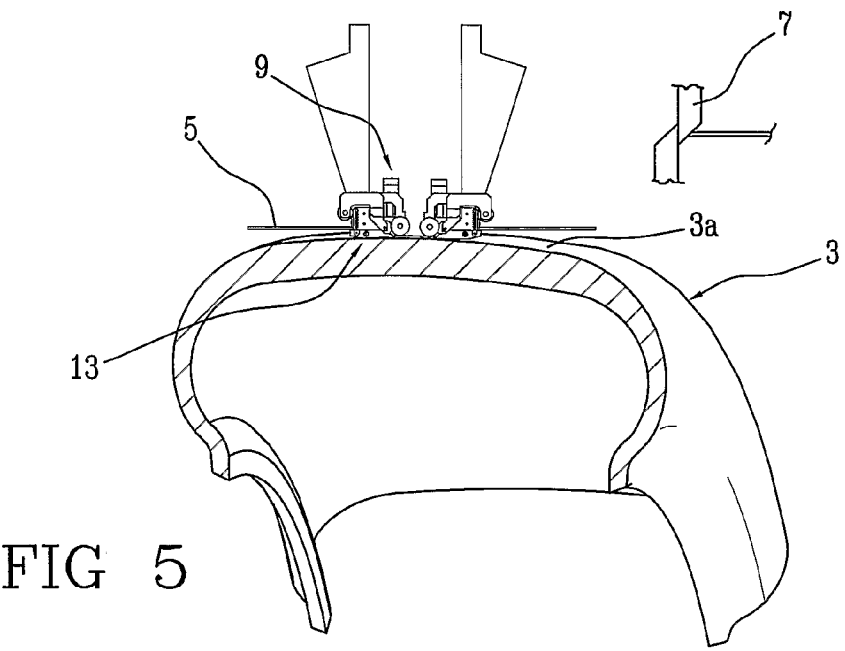
FIG. 5 shows a step subsequent to FIG. 4, in which the strip-like element is about to be applied, at a central portion thereof, onto the toroidal support.
Figure 6:
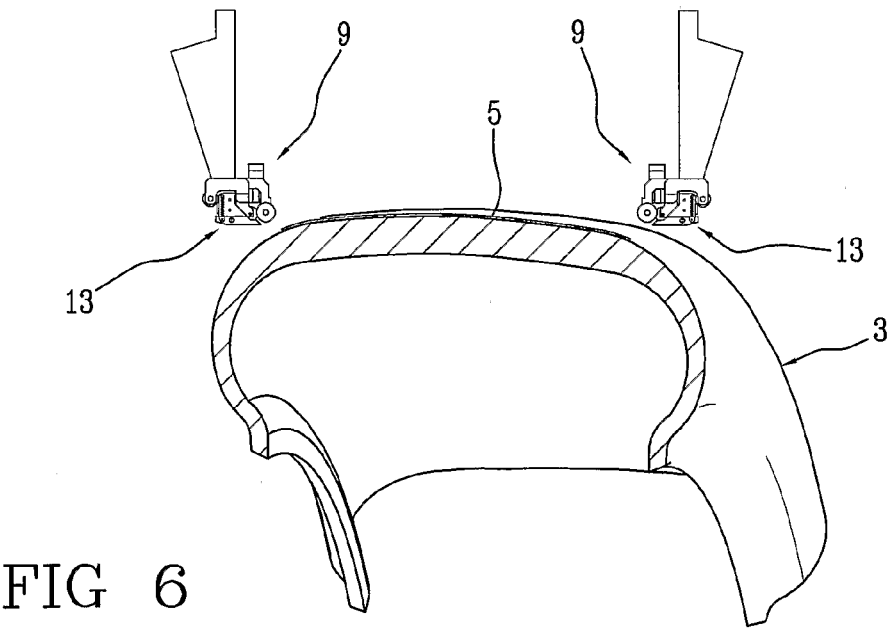
FIG. 6 shows a final step for application of the strip-like element.

Also provided are transverse-movement devices, not shown too as they can be made in any convenient manner, and which operate on arms 28 or arms 33 for example, to cause translation of each laying assembly 9, 9', once the above mentioned coupling has occurred, between a first operating condition at which, as shown in FIG. 5; they are disposed close to each other and a second operating condition at which, as shown in FIG. 6, they are spaced apart from an equatorial plane of the toroidal support 3.

Preparation and laying of each strip-like element 5 using the apparatus according to the present invention substantially takes place following the teachings of Patent Application WO01/38077 in the name of the same Applicant. In the following some steps are briefly described for easy understanding.

Starting from the condition shown in FIG. 3, the grip member 8 is brought to the first work position to engage the final end 6a of the continuous ribbon-like element 6 close to the cutting member 7 (FIG. 3). When the grip member 8 reaches the second work position, angular rotation of the supporting arms 28 is caused, so as to bring the presser elements 14, 10 in engagement relationship with the continuous ribbon-like element 6 driven by the grip member itself, and with the respective guide elements 13 under it. In other words, the presser elements 14, 10 are brought into coupling relationship with the respective guide elements 13.

Then operation of the cutting member 7 is actuated for carrying out cutting of the strip-like element 5. Under this circumstance, the guide elements co-operate with the first presser rollers 14 to retain the strip-like element 5, transversely stretched out in a substantially centred position relative to the equatorial plane of the toroidal support 3.

Also determined is translation of the laying assemblies 9, 9' towards the toroidal support 3 so that the strip-like element 5 is radially moved close to the toroidal support 3, brought into contact with and pressed, at its central portion, against the outer surface 3a, in the vicinity of the equatorial plane of the toroidal support itself. By mutual moving apart of the laying assemblies 9, 9', simultaneous translation of the first 14 and second 10 presser rollers is determined along the strip-like segment 5, away from the equatorial plane, so as to determine application of the strip-like element 5 onto the toroidal support 3, over the whole length thereof, by a pressing action progressively extending towards the opposite ends of the strip-like element itself, starting from the central portion of the latter.

Subsequently, an angular rotation of the toroidal support 3 is caused around its geometric axis X-X according to a predetermined angular pitch, to prepare it for application of a new strip-like element 5. Sequential repetition of the above described operations causes formation of belt 2 made up of at least one layer having a continuous circumferential extension around the geometric rotation axis X-X and formed of a plurality of strip-like elements 5 distributed in side by side relationship along the circumferential extension of the toroidal support 3.

It is further to be pointed out that, based on the teachings of Patent Application WO01/38077 for obtaining a perfect laying of the strip-like element 5 and avoiding problems connected with surface bending of the toroidal support 3, a relative angular rotation is carried out during application of each strip-like element 5, between the strip-like element itself and the toroidal support 3, around a correction axis that is substantially radial to the geometric rotation axis of the toroidal support.

The invention claimed is:

1. An apparatus for manufacturing a reinforcing structure for tyres of vehicles, comprising:
   a feeding unit to supply strip-like elements, each strip-like element comprising threadlike elements disposed parallel to each other and at least partly coated with at least one layer of elastomeric material;
   a laying unit comprising:
      two oppositely-moving laying assemblies to apply each of said strip-like elements onto a toroidal support according to a predetermined laying angle relative to a circumferential extension direction of said toroidal support, said laying assemblies each comprising at least one presser element movable in contrast relationship against an outer surface of the toroidal support; and
      said laying assemblies each comprising at least one guide element, the guide element being configured for positioning in direct contact with the toroidal support during laying of said strip-like element and configured to guide said strip-like element during laying of said strip-like element,
   wherein said guide element comprises at least one cavity in which said presser element is at least partly housed and in which the strip-like element and the toroidal support are in direct contact during laying of said strip-like element,
   wherein said guide element comprises a main body and two prongs defining the cavity together with said main body,
   wherein said prongs are pivotally mounted on said main body in an independent manner with respect to said main body, and wherein said guide element comprises spring means acting to keep one end of each of said prongs in contrast relationship with the toroidal support, during laying the strip-like element.

2. The apparatus as claimed in claim 1, wherein said guide element has a C-shaped configuration.

3. The apparatus as claimed in claim 1, wherein each laying assembly further comprises at least one second presser element disposed downstream of said first presser element to lay said strip-like element on the outer surface of said toroidal support over the entire width thereof.

4. The apparatus as claimed in claim 3, wherein said at least one second presser element consists of a pair of presser elements for each laying assembly, said presser elements being mounted in an independent manner.

5. The apparatus as claimed in claim 4, wherein the overall width of the second presser elements, measured from the outside of one of the pair of presser elements to the outside of the other of the pair of presser elements, is greater than or equal to the width of the strip-like element to be laid down.

6. The apparatus as claimed in claim 3, wherein second spring means is provided to keep said second presser element in contrast relationship against the outer surface of the toroidal support during laying of said strip-like element.

* * * * *